United States Patent Office 3,591,654
Patented July 6, 1971

3,591,654
PROCESS FOR ALKYLATION OF AN ISOPARAFFIN WITH AN OLEFIN AND WITH SULFURIC ACID-AROMATIC HYDROCARBON COMPLEX REACTION PRODUCTS
Arthur Newton, Johannesburg, Transvaal, Republic of South Africa, assignor to Texaco Trinidad, Inc., Trinidad, West Indies
No Drawing. Filed Jan. 31, 1969, Ser. No. 795,746
Int. Cl. C07c 3/54
U.S. Cl. 260—683.61                                6 Claims

ABSTRACT OF THE DISCLOSURE

Hydrocarbon stock comprising paraffins and aromatics is treated with strong sulfuric acid forming acid complex reaction products and the resulting acid-acid complex mixture operation, having a titratable acidity above 85 percent sulfuric acid by weight, is employed as a catalyst for the alkylation of an isoparaffin with an olefin and is more active as a catalyst than is indicated by its titratable acidity.

BACKFROUND OF THE INVENTION

Field of the invention

This invention is related to an alkylation process with improved utilization of the sulfuric acid employed as a catalyst in the alkylation of an isoparaffin with an olefin. More particularly, it relates to an improved sulfuric acid alkylation process employing an activated catalyst obtained by treating a paraffin hydrocarbon stock containing aromatics with strong sulfuric acid producing an acid phase of reduced acidity which is unexpectedly effective as an alkylation catalyst.

Description of the prior art

In the alkylation of an isoparaffin with an olefin, it is known to discharge used acid at various strengths over the range of about 85 to 95% by weight sulfuric acid when charging fresh acid of about 98.0 to 99.5% strength. The used acid is discarded and is usually subjected to a recovery process, such as by burning to sulfur dioxide, when the acidity is about 90% or lower. When the discharge acidity is in the range of about 92 to 95%, the acid is usually charged to another alkylation reactor in which the acidity drops as alkylation proceeds. Regardless of the level of acidity of the acid, the acidity drops to a minimum level for catalytic activity as alkylation process proceeds. As a practical matter, in continuous operation fresh acid of higher strength is continuously or periodically charged and used acid of lower strength is continuously or periodically discharged in an equivalent amount.

Quite unexpectedly it has been found that the acid catalyst of my invention will catalyze the alkylation of an isoparaffin with an olefin without suffering a decrease in titratable acidity.

SUMMARY OF THE INVENTION

A hydrocarbon stock, such as n-paraffins in the $C_{10}$ to $C_{15}$ range, containing impurities such as color and odor bodies, and a small amount of aromatics, is treated with strong sulfuric acid thereby improving the odor and color of the hydrocarbon stock removing at least part of the aromatics which are present in the sydrocarbon feed stock. The resulting acid of reduced acidity and containing acid complex reaction products is separated from the treated hydrocarbon stock. This acid containing acid complex reaction products has been found to be unexpectedly effective as a catalyst for the alkylation of isoparaffins and olefins.

The chief advantage of my invention is that acid which has been used in a treating process, and which has a much lower monetary value than the original acid can be used as an alkylation catalyst, thus resulting in lower alkylation catalyst cost.

PREPARATION OF CATALYST

The sulfuric acid catalyst is prepared by treating a predominately normal paraffin hydrocarbon stock containing at least a minor amount of aromatics with strong sulfuric acid. For best results as an alkylation catalyst the used treating acid should have a titratable acidity of at least about 85% by weight sulfuric acid, and preferably about 88 to 95%. It should not contain free sulfur trioxide.

Suitable hydrocarbon stocks are those containing normal paraffins of from seven to twenty-four carbon atoms, and preferably $C_9$ to $C_{18}$. The preferred charge stock contains predominantly n-paraffins, for example, about 90% n-paraffins. Such a stock usually contains a small amount of odor and color bodies and aromatics, most of which are removed when treated with strong acid. Although I prefer to treat paraffin hydrocarbon stocks having a relatively low aromatic content, stocks which are high in aromatic content, such as cumene stocks, are also satisfactory.

The strong sulfuric acid used to prepare the catalyst and to treat hydrocarbon charge stocks can vary over the range of about 92% $H_2SO_4$ to acid containing 20% free sulfur trioxide or 20% fuming sulfuric acid. I prefer to use acid in the range of 94 to 99.5% $H_2SO_4$.

The hydrocarbon stock can be treated in a batch operation, in successive treatments, or in a multistage operation, such as in countercurrent operation. The treatment should be carried out in such a manner as to remove as much as possible of the odor and color bodies and the aromatics. Although the use of an acid dosage as small as possible in relation to the hydrocarbon is desirable, as a practical matter it often is advantageous to use less efficient treating conditions with a larger acid dosage, and treat more hydrocarbon in successive treatments or in countercurrent flow of acid and hydrocarbon.

The catalyst is produced by treating the aromatic-containing hydrocarbon stock with sulfuric acid and separating the acid phase. When used for the alkylation of an isoparaffin with an olefin, the catalyst acts as if it is more active or effective than indicated by the titratable acidity. The catalyst can be used to bring about alkylation without a decrease in acidity, however, when the catalyst has a titratable acidity above the minimum strength required for alkylation, it can be used until the acidity drops to the minimum acidity. For example, if the acidity is about 92.0%, it can be used until the acidity drops to about 85–88%. It can be used as produced in the treating step, or blended with strong, fresh acid such as used in alkylation, for example, 25 to 75% of my new catalyst and 75 to 25% of fresh 99.5% sulfuric acid.

EXAMPLE I

A sample of catalyst for the alkylation of isobutane with butyleens was prepared by the following procedure. Sulfuric acid in the amount of 728 pounds was used to treat 1171 pounds of a normal paraffin stock containing about 0.16 weight percent aromatics and having about a +16 Saybolt color. The 1171 pounds of hydrocarbon was treated as nine separate samples. Fresh commercial white sulfuric acid of 98.0% concentration was used in the first three treatments (Treatments 1, 2 and 2A). The used acid from these three treatments was then blended and used for the acid charge to Treatment 3. The used acid from each subsequent treatment was reused for the next successive treatment. The n-paraffin charge for each treatment was a raw, untreated stock containing a small amount of aromatics and odor and color bodies. The n-paraffin stock contained hydrocarbons in the $C_{10}$–$C_{18}$ range, with approximately 96% of hydrocarbons in the $C_{11}$–$C_{16}$ range.

The amount of acid used for the nine treats was 63.4, 26.3, 109.5, 105.0, 105.0, 101.0, 98.0 and 94.0 pounds respectvely, for 114.0, 44.5, 44.5, 203.0, 190.5, 159.0, 127.0, 165.0 and 124 pounds of hydrocarbons. The acid dosages for the nine treats were respectively, 148, 157, 158, 144, 147, 176, 212, 158, and 202 pounds of acid per barrel of n-paraffin stock.

The acid treats were carried out at 70–80° F. with a mixing time of 30 minutes. At the end of each treat, the reaction mixture was allowed to separate by gravity into a hydrocarbon and an acid phase. The n-paraffin hydrocarbon phase from each treat was treated with 5% by volume of 15° Baumé caustic for 5 minutes, and washed twice with 5% by volume of water for 5 minutes. The n-paraffin product was filtered and tested.

The acid phase or catalyst from the final treat produced in the manner described above had a 64° Baumé gravity, a titratable acidity of 90.8, water content of 5.0%, and contained 0.12% aromatics.

Test data on the hydrocarbon charge stocks treated were as follows:

Data on the hydrocarbon products after acid treatment are as follows:

|  | Products from treat | | | | | | | |
|---|---|---|---|---|---|---|---|---|
| Tests | 1 | 2–2A | 3 | 4 | 5 | 6 | 7 | 8 |
| Gravity, °API | 54.4 | 54.1 | 54.1 | 54.2 | 54.1 | 54.1 | 54.1 | 54.1 |
| Raney nickel sulfur, p.p.m | 2.4 | 1.3 | 0.7 | 0.4 | 0.3 | 0.7 | 0.4 | 0.3 |
| Turbidimetric sulfur, p.p.m | 1.0 | 8 | 8 | 1.0 | 4 | 5 | 3 |
| Bromine index | 7 | 13 | 15 | 7 | 5 | 10 | 100 |
| Dinuclear aromatics, wt. percent | 0 | 0.04 | 0 | 0 | 0.01 | 0.04 | 0.07 |
| Aromatics, wt. percent | 0.07 | 0.08 | 0.32 | 0.13 | 0.13 | 0.20 | 0.13 |
| n-Paraffin purity, wt. percent | Above 98 percent | | | | | | | |

|  | Charge to treat | | | |
|---|---|---|---|---|
| Tests | 2–2A–3 | 4 | 5–6–7 | 8 |
| Gravity,° API | 54.1 | 54.2 | 54.1 | 54.1 |
| Raney nickel sulfur, p.p.m | 2.0 | 1.3 | 2.3 | 2.0 |
| Turbidimetric sulfur, p.p.m | 2 | 1 | 4 | 2 |
| Bromine index | 73 | 100 | 73 | 73 |
| Dinuclear aromatics, wt. percent | 0.07 | 0.13 | 0.23 | 0.07 |
| Aromatics, wt. percent | 0.15 | 0.63 | 0.18 | 0.15 |
| n-Paraffin purity, Wt. percent | 98.5 | 98.3 | 97.8 | 98.5 |
| Carbon No. distribution, wt. percent: | | | | |
| $C_{10}$ | 2.0 | 4.0 | 1.6 | 2.0 |
| $C_{11}$ | 11.8 | 7.7 | 13.1 | 11.8 |
| $C_{12}$ | 17.2 | 18.7 | 19.9 | 17.2 |
| $C_{13}$ | 23.3 | 22.5 | 20.6 | 23.3 |
| $C_{14}$ | 21.2 | 21.7 | 21.3 | 21.2 |
| $C_{15}$ | 15.3 | 15.4 | 14.6 | 15.3 |
| $C_{16}$ | 7.0 | 7.4 | 6.4 | 7.0 |
| $C_{17}$ | 1.8 | 2.2 | 2.0 | 1.8 |
| $C_{18}$ | 0.4 | 0.4 | 0.5 | 0.4 |
| Total | 100.0 | 100.0 | 100.0 | 100.0 |

Alkylation

The catalyst of my invention is used in the same manner and under the same conditions for the alkylation of an isoparaffin with an olefin as the usual 98.0 to 99.5 percent sulfuric acid known in the art. It can be used alone or in various proportions with fresh, white 98.0 to 99.5 percent sulfuric acid. About 25 to 75 percent as much acid catalyst by volume as hydrocarbon is usually used for alkylation.

Propylenes, butylenes, and amylenes are the preferred olefins, although higher molecular weight olefins can be alkylated. Isobutane is the preferred isoparaffin, although isopentane can be used. A large excess of isobutane is used, for example, as much as 60–80 volume percent of the hydrocarbons in the alkylation reaction mixture. Consequently, a large quantity of isobutane must be recovered and recycled from the alkylate product.

Sufficient pressure to keep the reactants in the liquid phase, which is usually about 15 to 75 p.s.i.g., at a temperature of about 30 to 60° F., is used. Efficient mixing is essential for good results.

EXAMPLE II

In order to study the effectiveness of the catalyst a 50–50 volume percent mixture of the new catalyst prepared as described earlier and fresh white acid evaluated for the alkylation of isobutane with butylenes in a continuous pilot unit run. The white acid used in the blend had a titratable acidity of 98.3% $H_2SO_4$ and 1.2% by weight of water. The new catalyst had a titratable acidity of 89.6% by weight $H_2SO_4$, 5.4% by weight of water and several percent of odor and color bodies and aromatics removed from hydrocarbon stocks. The 50–50 blend had a titratable acidity of 93.8% $H_2SO_4$ and 3.2% by weight of water. Sufficient blended acid was added continuously to the alkylation reactor to maintain the desired system acidity, and an equivalent amount was discharged.

A comparison of this catalyst blend with a catalyst consisting of fresh white acid of 98.3% concentration is shown below:

| Make-up acid | Acid consumption, lb./gal. | | System acid strength, wt. percent | Alkylate product RON | | ASTM distillation ° F. | | |
|---|---|---|---|---|---|---|---|---|
|  | White acid | Total acid |  | Clear | +3 cc. TEL | IBP | 90% | EP |
| Fresh white acid | 0.29 | 0.29 | 90.0–91.0 | 94.8 | 106.6 | 108 | 280 | 391 |
| 50–50 mix of white acid and new catalyst | 0.20 | 0.40 | 90.9 | 95.0 | 106.6 | 108 | 281 | 389 |

NOTE.—Operating conditions: 10 to 1 isobutane to olefin ratio, 0.35 v./hr./v. olefin space velocity, 40 mole percent isobutylene and 60 mole percent butylene-1 in the olefin feed, 2,300 r.p.m. impeller speed, 75 mole percent isobutane in the reacted mix, temperature of 50 °F. and 60 volume percent acid in the reactor.

As noted above, when operating at 90.9 percent system acid strength with the 50–50 mixture of white acid of 98.3% strength and my new catalyst as make-up acid no reduction in the quality of the alkylate was apparent as compared to results obtained for operation with fresh white acid. Alkylate with Research octane number of 95.0 (clear) and 106.6 (+3 cc. TEL) and ASTM distillation 90 percent and end points of 281 and 389° F., respectively, were obtained at typical operating conditions for butylene alkylation. Total acid consumption was 0.40 pound per gallon which corresponds to 0.20 pound per gallon of white acid. The consumption of white acid was 0.09 pound per gallon less than was obtained for operation with only white make-up acid. These results show a 31 percent reduction in white acid consumption when an equal volume of spent acid from normal paraffin treatment is included with the white acid added to the alkylation unit.

Obviously, many modifications and variations of the invention as hereinabove set forth, may be made without departing from the spirit and scope thereof, and therefore, only such limitations should be imposed as are indicated in the appended claims.

We claim:

1. A process for the alkylation of an isoparaffin with an olefin which comprises:
    contacting a hydrocarbon stock comprising a major amount of normal paraffins and a minor amount of aromatic hydrocarbons with strong sulfuric acid to form a reaction mixture containing sulfuric acid-aromatic hydrocarbon complex reaction products,
    separating said reaction mixture into a hydrocarbon phase and an acid phase comprising sulfuric acid-aromatic hydrocarbon complex reaction products, said acid phase having a titratable acidity of at least about 85 percent sulfuric acid by weight, and
    contacting said acid phase in an alkylation zone with an isoparaffin and an olefin under sulfuric acid catalyst alkylation conditions.

2. Process of claim 1 in which said strong sulfuric acid is in the range of about 94 percent by weight to 20 percent fuming sulfuric acid.

3. Process of claim 1 in which said strong sulfuric acid is in the range of about 94 to 99.5 percent sulfuric acid.

4. Process of claim 1 in which said titratable acidity of said acid phase is in the range of 88 to 95 percent by weight sulfuric acid.

5. Process of claim 1 in which said n-paraffins are of about $C_9$ to $C_{15}$ carbon atoms.

6. Process of claim 1 in which said hydrocarbon stock contains odor and color bodies.

References Cited
UNITED STATES PATENTS

| | | | |
|---|---|---|---|
| 2,198,595 | 4/1940 | Amos et al. | 260—671(C) |
| 2,267,458 | 12/1941 | Goldsby | 260—683.61 |
| 2,649,486 | 8/1953 | Putney | 260—683.61 |

DELBERT E. GANTZ, Primary Examiner

G. J. CRASANAKIS, Assistant Examiner

U.S. Cl. X.R.

208—266